(12) United States Patent
Yuan et al.

(10) Patent No.: US 11,558,998 B2
(45) Date of Patent: Jan. 24, 2023

(54) DUAL HANDLE SPEED ADJUSTMENT DEVICE AND LAWN MOWER USING SAME

(71) Applicant: SUMEC HARDWARE & TOOLS CO., LTD., Nanjing (CN)

(72) Inventors: Guo-Hui Yuan, Nanjing (CN); Jian-Hui Wang, Nanjing (CN); Kai Liu, Nanjing (CN); Lin-Miao Chen, Nanjing (CN)

(73) Assignee: SUMEC HARDWARE & TOOLS CO., LTD., Nanjing (CN)

( * ) Notice: Subject to any disclaimer, the term of this patent is extended or adjusted under 35 U.S.C. 154(b) by 542 days.

(21) Appl. No.: 16/787,563

(22) Filed: Feb. 11, 2020

(65) Prior Publication Data
US 2020/0329638 A1    Oct. 22, 2020

(30) Foreign Application Priority Data

Apr. 16, 2019    (CN) .......................... 201920514108.0

(51) Int. Cl.
*A01D 34/82*    (2006.01)
*A01D 34/00*    (2006.01)
*A01D 34/68*    (2006.01)
*A01D 101/00*    (2006.01)

(52) U.S. Cl.
CPC ......... *A01D 34/824* (2013.01); *A01D 34/006* (2013.01); *A01D 2034/6843* (2013.01); *A01D 2101/00* (2013.01)

(58) Field of Classification Search
CPC ................ A01D 34/824; A01D 34/006; A01D 2034/6843; A01D 2101/00
See application file for complete search history.

(56) References Cited

U.S. PATENT DOCUMENTS

| | | | |
|---|---|---|---|
| 4,466,232 A * | 8/1984 | Beugelsdyk ....... | A01D 34/6806 56/10.8 |
| 5,375,674 A * | 12/1994 | Peter .................. | A01D 34/6806 56/11.1 |
| 8,312,946 B2 | 11/2012 | Lahey et al. | |
| 9,651,138 B2 * | 5/2017 | Helin .................. | F16H 59/0278 |
| 9,717,177 B2 * | 8/2017 | Bian .................... | A01D 34/824 |
| 10,485,167 B2 * | 11/2019 | Smith ................ | A01D 34/6806 |
| 11,102,924 B2 * | 8/2021 | Xiao .................. | A01D 34/6806 |

* cited by examiner

*Primary Examiner* — Sean M Michalski
(74) *Attorney, Agent, or Firm* — Muncy, Geissler, Olds & Lowe, P.C.

(57) ABSTRACT

A dual handle speed adjustment device includes left and right handles, a link and a slider. The left and right handles each have an actuating end, an operating end and a handle hinge as a pivot axis. The slider has a first connection end connected to the actuating ends of the left and right handles, a second connection end connected to a speed control device, and a part between the first and second connection ends hinged to one end of the link, which has the other end thereof provided with a link rotation axis. The left and right handles independently drive the slider to move when they are turned. The invention can realize the separate operation of two speed adjusting handles.

10 Claims, 7 Drawing Sheets

DUAL HANDLE SPEED ADJUSTMENT DEVICE AND LAWN MOWER USING SAME

BACKGROUND OF THE INVENTION

1. Field of the Invention

The present invention relates to the field of garden machinery technology, and more particularly to dual handle speed adjustment device and lawn mower.

2. Description of the Related Art

Lawn mowers are more commonly used garden tools. When the lawnmower is working, it needs to adjust the forward speed or the cutter head rotation speed to meet different working conditions. Because the lawn mower usually needs to be operated by both hands, from the convenience and safety considerations, the speed adjustment device usually has two manual operation ends respectively disposed at the left side and the right side, corresponding to the user's left and right hands. However, in the prior art, the left and right manual speed adjusting mechanisms cannot be operated separately and will interfere with each other in actual use. Specifically, when one of the two speed-adjusting handles is operated, the other speed-adjusting handle will follow, which makes the operation inconvenient. For example, when one hand pulls the handle toward the handlebar during speed adjustment, if the other hand is placed between the speed adjustment handle and the handlebar at this time, it will be squeezed by the corresponding speed adjustment handle, affecting the speed adjustment operation or even pinching your fingers. Therefore, it is needed to provide a dual handle speed adjustment device and a lawn mower that allow independent operation of the two handles.

SUMMARY OF THE INVENTION

The present invention has been accomplished under the circumstances in view. It is the main object of the present invention to provide a dual handle speed adjustment device and a lawn mower, which solves the technical problem that the prior art dual handle speed adjustment device cannot be independently operated.

To achieve this and other objects of the present invention, a dual handle speed adjustment device comprises a left handle, a right handle, a link and a slider. The left handle and the right handle are each provided with an actuating end, an operating end and a handle hinge as a pivot axis. The slider comprises a first connection end and a second connection end. The first connection end of the slider is connected to the actuating end of the left handle and the actuating end of the right handle. The left handle and the right handle independently act on the slider when they are turned. The second connection end of the slider is connected to a speed control device. A part of the slider between the first connection end and the second connection end is hinged to one end of the link. The link has an opposite end thereof provided with a link rotation axis.

Preferably, the left handle and the right handle are each provided with an elastic device for driving the reset of the left handle and the right handle.

Preferably, the elastic device is a torsion spring sleeved on the handle hinge with one end thereof connected to the left handle and the right handle.

Preferably, the handle hinge of each of the left handle and the right handle is a through hole connected to a handle pin. The through hole of the handle hinge is provided with a through-hole extension portion. The through-hole extension portions of the left handle and the right handle are disposed opposite to each other. The slider is set between the left handle and the right handle.

Preferably, the link is connected to the slider through a second link pin, and the link rotation axis is a first link pin.

Preferably, the actuating ends of the left handle and the right handle are respectively provided with a slider connection hole. The slider connection hole is connected to the first connection end of the slider through a slider pin.

Preferably, the slider connection hole is an oblong hole.

Preferably, the slider is connected to the speed control device through a pull wire. The slider has a pull wire connection end provided with a pull wire connection hole for connecting the pull wire. The pull wire connection end of the slider is an arc-shaped end. The arc-shaped end has an arc shape surface provided with a plurality of stopper blocks. The pull wire is connected between the stopper blocks.

Preferably, the link further comprises a connection slot connected to the slider.

Preferably, the dual handle speed adjustment device further comprises a housing. The housing comprises a lower shell and an upper shell connected to each other. The lower shell is provided with a lower shell outlet end. The upper shell is provided with an upper shell outlet end. The link is connected to the lower shell and the upper shell through a first link pin. The handle hinges of the left handle and the right handle are connected to the lower shell and the upper shell through a handle pin.

To achieve this and other objects of the present invention, a lawn mower comprises a dual handle speed adjustment device as described above.

The invention achieves the beneficial effects as follows:

1. The invention can realize separate operation of two handles. In actual use, only one of the handles needs to be operated to complete the speed adjusting operation, and mutual interference between the two handles during the speed adjusting process is avoided.

2. The left and right handles share a link, a slider, and a pull wire, which minimizes the complexity of the device and reduces costs.

3. The invention has a compact structure. The slider is arranged between the left and right handles and passes through the link, which reduces the volume of the dual handle speed adjustment device and facilitates the installation of the dual handle speed adjustment device.

DETAILED DESCRIPTION OF THE INVENTION

The following further describes the invention with reference to the accompanying drawings. The following embodiments are only used to more clearly explain the technical solution of the present invention and cannot be used to limit the protection scope of the present invention.

Figure 1:
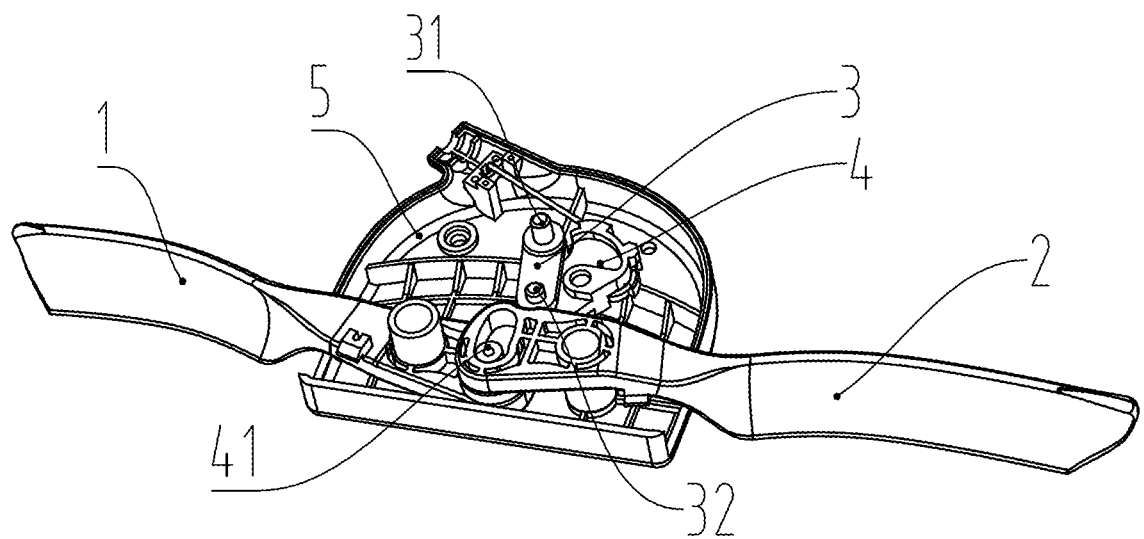
FIG. 1 is a structural diagram of a dual handle speed adjustment device in accordance with the present invention (the upper shell is not shown).
Figure 2:
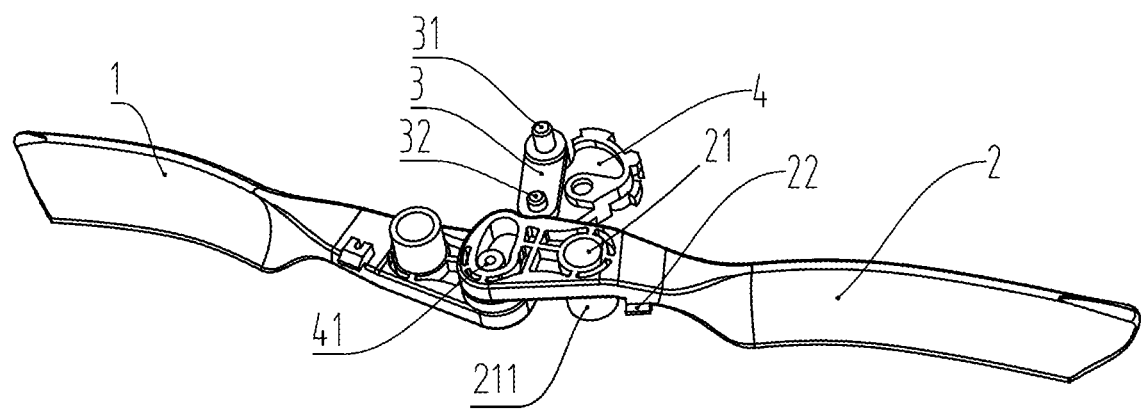
FIG. 2 is another structural diagram of the dual handle speed adjustment device in accordance with the present invention (the upper shell and the lower shell are not shown).

Referring to FIGS. 1 and 2, a dual handle speed adjustment device in accordance with the present invention generally comprises a left handle 1, a right handle 2, a link 3 and a slider 4. The left handle 1 and the right handle 2 are each provided with an actuating end (power output end), an operating end (a part directly contacted by a hand during operation), and a handle hinge 11 or 21 as a pivot axis. The slider 4 has a first connection end and a second connection end. The first connection end is connected to the actuating end of the left handle 1 and the actuating end of the right handle 2. The left handle 1 and the right handle 2 can independently act on the slider 4 when they are turned. The second connection end of the slider 4 is connected to a speed control device. A part of the slider 4 between the first connection end and the second connection end is hinged to one end of the link 3, and the other end of the link 3 is provided with a link rotation axis.

Specifically, in order to make the handle easier to reset, the left handle 1 and the right handle 2 of this embodiment are each provided with an elastic device for driving the reset of the left handle 1 and the right handle 2. The elastic device is preferably a torsion spring. The middle of the torsion spring (the spiral part of the torsion spring) is sleeved on the handle hinge 11 or 21, one end of the torsion spring is connected to the left handle 1 and the right handle 2, and the other end of the torsion spring can be connected to the housing where the left handle 1 and the right handle 2 are located.

Figure 3:
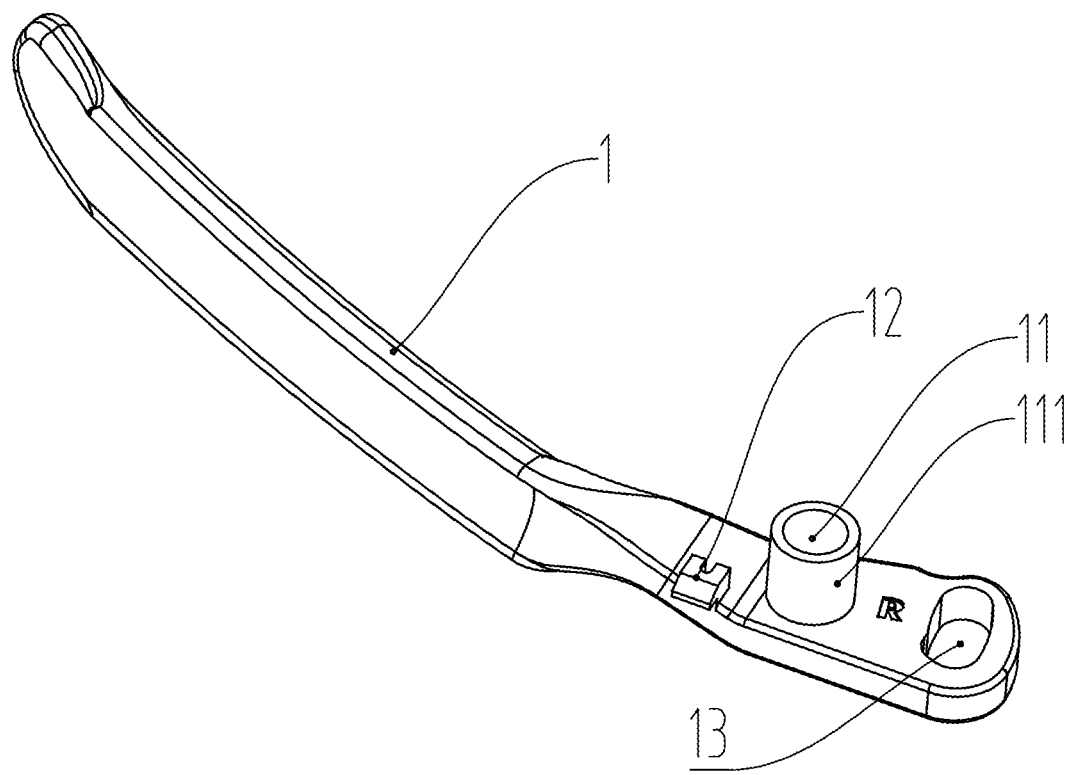
FIG. 3 is a structural diagram of the left handle.

Referring to FIGS. 2 and 3, in order to facilitate the connection of the torsion spring, the left handle 1 and the right handle 2 of this embodiment are also provided with a torsion spring connection portion 12 or 22, and the torsion spring connection portions 12 and 22 are used to connect one end of the torsion spring.

The actuating ends of the left handle 1 and the right handle 2 are respectively provided with a slider connection hole 13. The slider connection holes 13 are connected to the first connection end of the slider 4 through a slider pin 41. The slider connecting hole 13 is preferably an oblong hole.

Each of the handle hinges 11 and 21 is a through hole, which is connected to a handle pin, and the two ends of the handle pin are connected to the housing where the left and right handles are located.

The through hole of the handle hinge 11 or 21 has a through-hole extension portion 111 or 211. The through-hole extension portions 111 and 211 mainly have two functions. One is that the through-hole extension portions 111 and 211 can be used to connect the middle spiral part of the torsion spring, and the other is that the through-hole extension portions 111 and 211 enable the left handle 1 and the right handle 2 to be staggered. The so-called stagger is that the ends of the through-hole extension portions 111 and 211 bear against the housing, preventing the left handle 1 and the right handle 2 from sliding along the handle pin. In this way, when the through-hole extension portions 111 and 211 of the left handle 1 and the right handle 2 are relatively set, a gap is left between the left handle 1 and the right handle 2 for the placement of the slider 4. Therefore, the slider 4 of this embodiment is preferably disposed between the left handle 1 and the right handle 2, so that the overall thickness of this embodiment can be minimized, and its structure can be made more compact.

Specifically, the link 3 is connected to the slider 4 through a second link pin 32, and the link rotation axis is a first link pin 31, and the two ends of the first link pin 31 are used to connect the housing or mezzanine where the link 3 is located.

Figure 4:
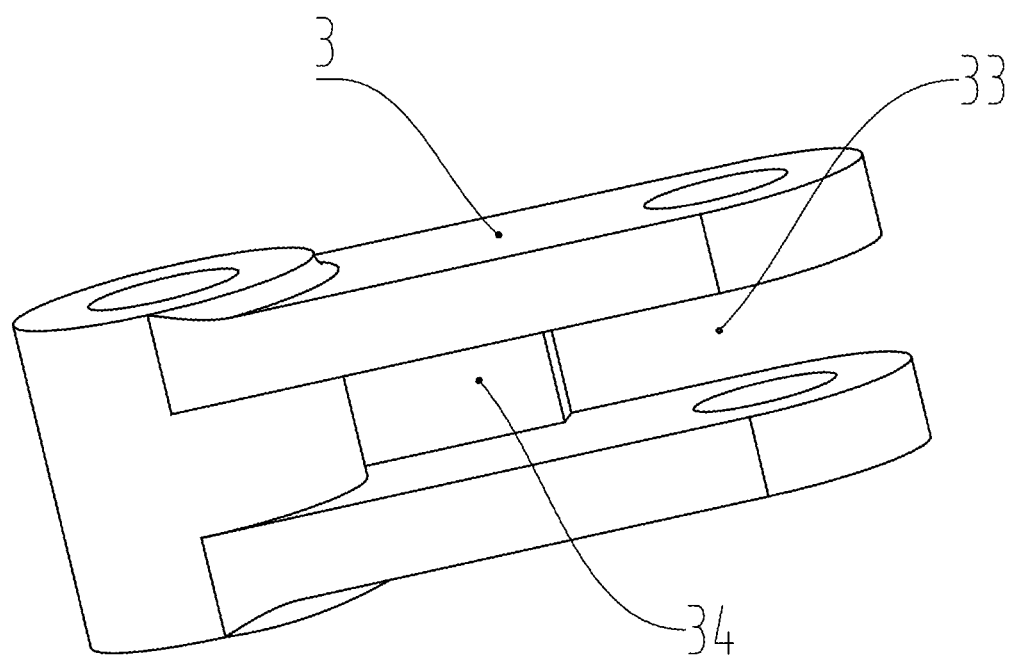
FIG. 4 is a structural diagram of the link.

As shown in FIG. 4, the link 3 is also provided with a connection slot 33, and the connection slot 33 is connected to slider 4. A reinforcing plate 34 is also provided in the connection slot 33. The connection slot 33 divides the slider connection end of link 3 into two pieces, and the space between these two pieces is used to accommodate the slider 4. The reinforcing plate 34 is provided in the connection slot 33 in order to reinforce the strength of the connection slot 33.

Figure 5:
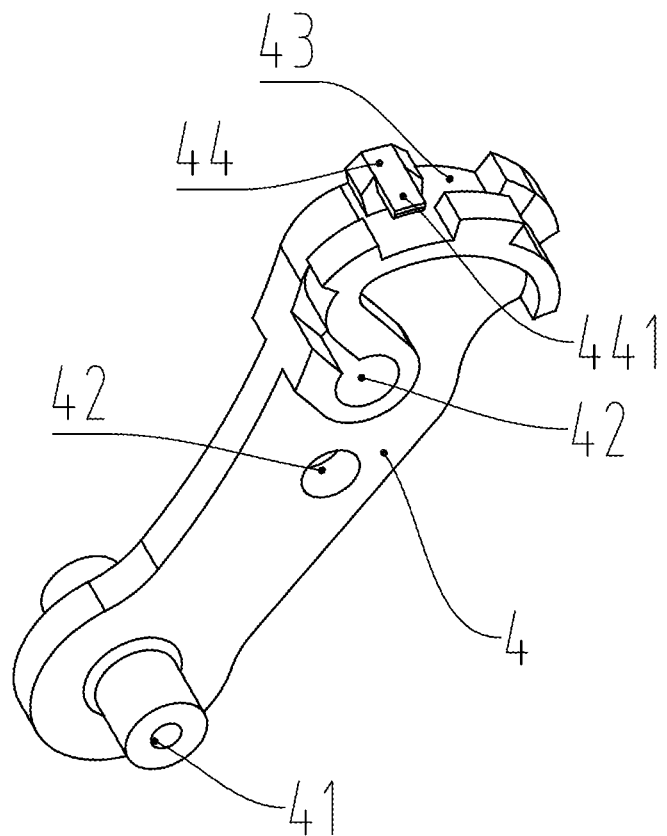
FIG. 5 is a structural diagram of the slider.

As shown in FIG. 5, the slider 4 is connected to the speed control device through a pull wire 7. The speed control device is arranged on the head of the equipment to which the dual handle speed adjustment device is applied, such as the head of a lawn mower.

The pull wire connection end of the slider 4 is provided with a pull wire connection hole 42 for connecting the pull wire 7. The pull wire connection hole 42 is a cylindrical blind hole for placing a cylindrical end of the pull wire 7. The pull wire connection end of the slider 4 is preferably an arc-shaped end 43. The outer surface of the arc-shaped end 43 is an arc shape surface, which is used to connect the pull wire 7. The arc shape surface can make the pull and relax transition of the pull wire 7 smoother and can avoid the damage of the pull wire 7 caused by the sudden change of the shape of slider 4.

The arc shape surface of the arc-shaped end 43 is also provided with a plurality of stopper blocks 44 in a total of two rows. A pull wire groove is formed between the two rows of stopper blocks 44 for placing the pull wire 7. One stopper block 44 is provided with a stop rod 441. The stop rod 441 can prevent the pull wire 7 from slipping out of the two rows of stopper blocks 44 (especially when the pull wire 7 is loose), but the 1 stop rod 441 should not affect the combination or disengagement of the pull wire 7 and the arc-shaped end 43.

Figure 6:
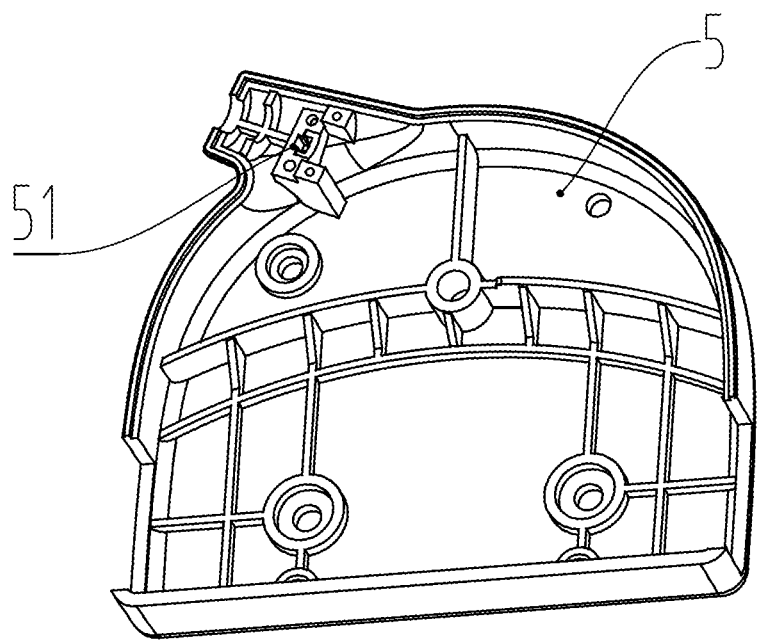
FIG. 6 is a structural diagram of the lower shell.
Figure 7:
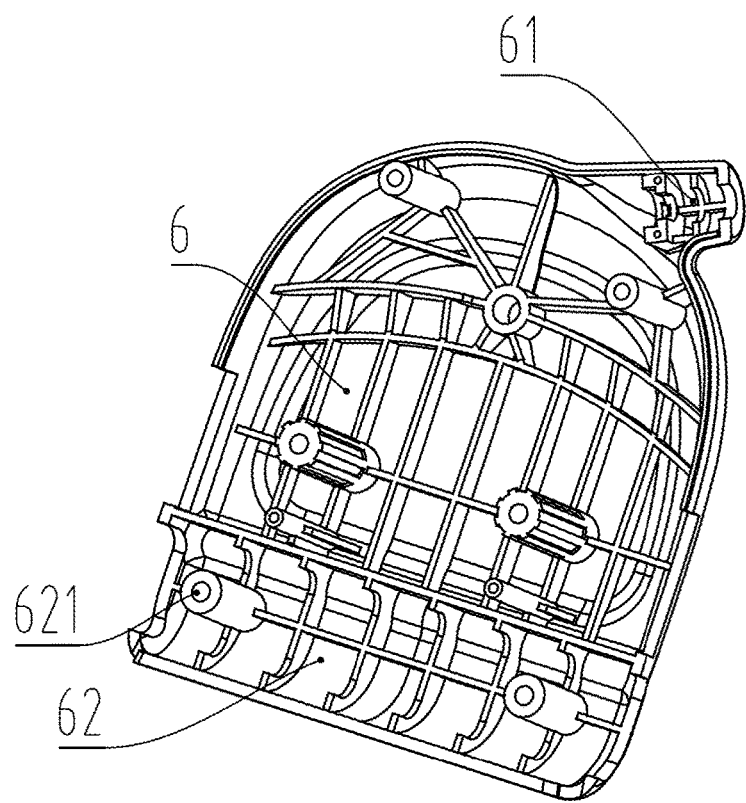
FIG. 7 is a structural diagram of the upper shell.
Figure 8:
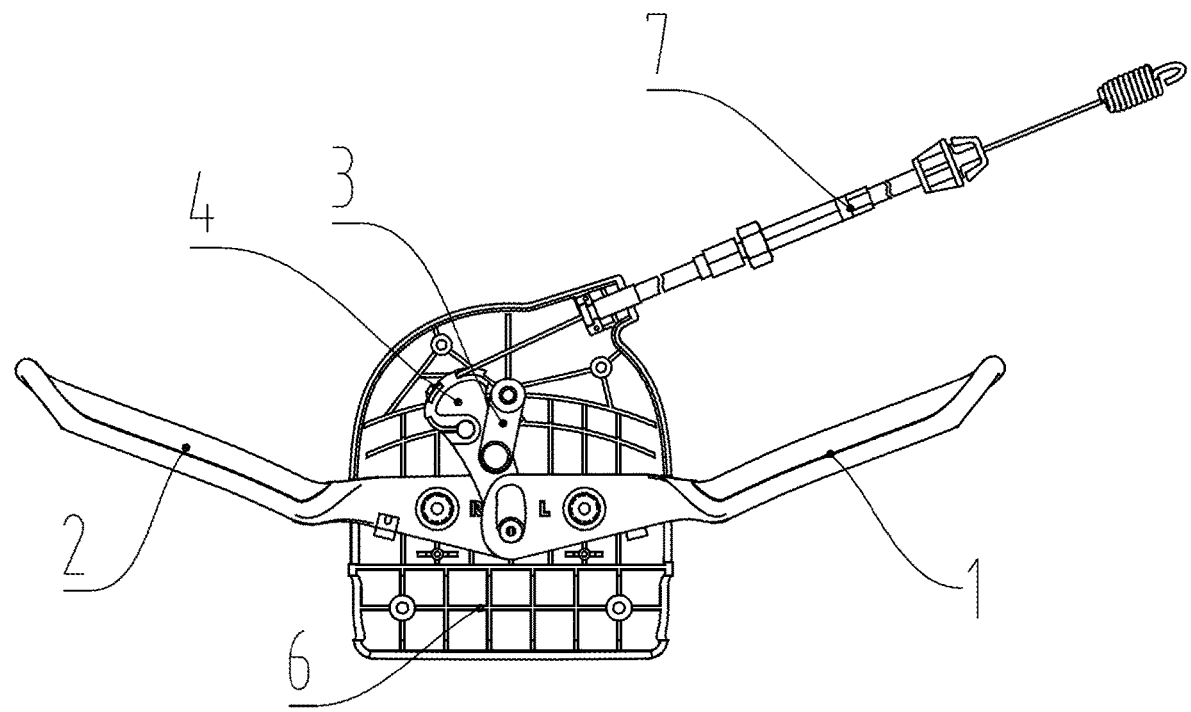
FIG. 8 is a first working state diagram of the dual handle speed adjustment device of the present invention (the left handle and the right handle are loosened).

Referring to FIG. 1, FIG. 5 and FIG. 6, the dual handle speed adjustment device further comprises a housing, which includes a lower shell 5 and an upper shell 6 connected to each other. The lower shell 5 is provided with a lower shell outlet end 51. The upper shell 6 is provided with an upper shell outlet end 61. The lower shell outlet end 51. The lower shell outlet end 51 and the upper shell outlet end 61 are engaged to form a complete wire outlet hole. The wire outlet hole is used to connect the end of the shell of the pull wire 7 and cooperate with the slider 4 to pull out the pull wire 7. The link 3 is connected to the lower shell 5 and an upper shell 6 through the first link pin 31. The handle hinges 11 of the left handle 1 and the right handle 2 are connected to the lower shell 5 and an upper shell 6 through the handle pin.

The upper shell 6 is also provided with a handle connection portion 62, and the handle connection portion 62 is provided with screw posts 621 for the connection of the left handle 1 and the right handle 2.

Figure 9:
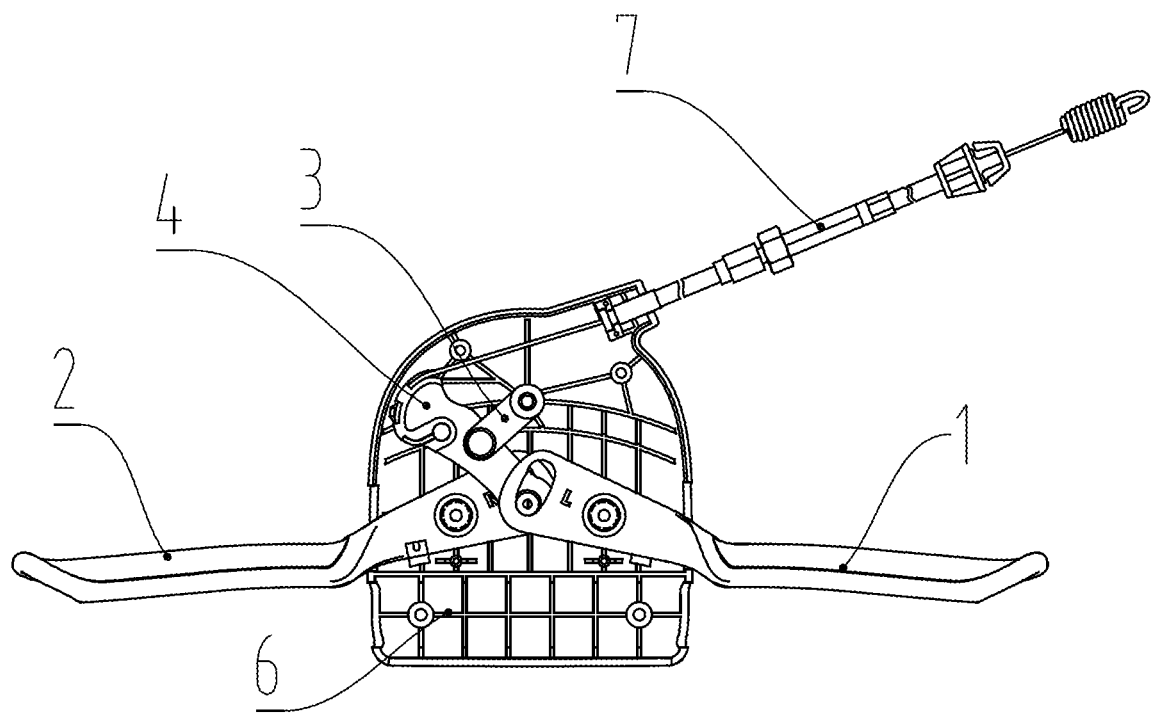
FIG. 9 is a second working state diagram of the dual handle speed adjustment device of the present invention (the left handle and the right handle are pinched).

With reference to FIGS. 8 to 11, FIG. 8 shows the left handle 1 and the right handle 2 in the released state during operation. When speed adjustment is required, as shown in FIG. 9, the left handle 1 and the right handle 2 can be driven at the same time to drive the slider 4 to pull the pull wire 7, thereby adjusting the speed.

Figure 10:
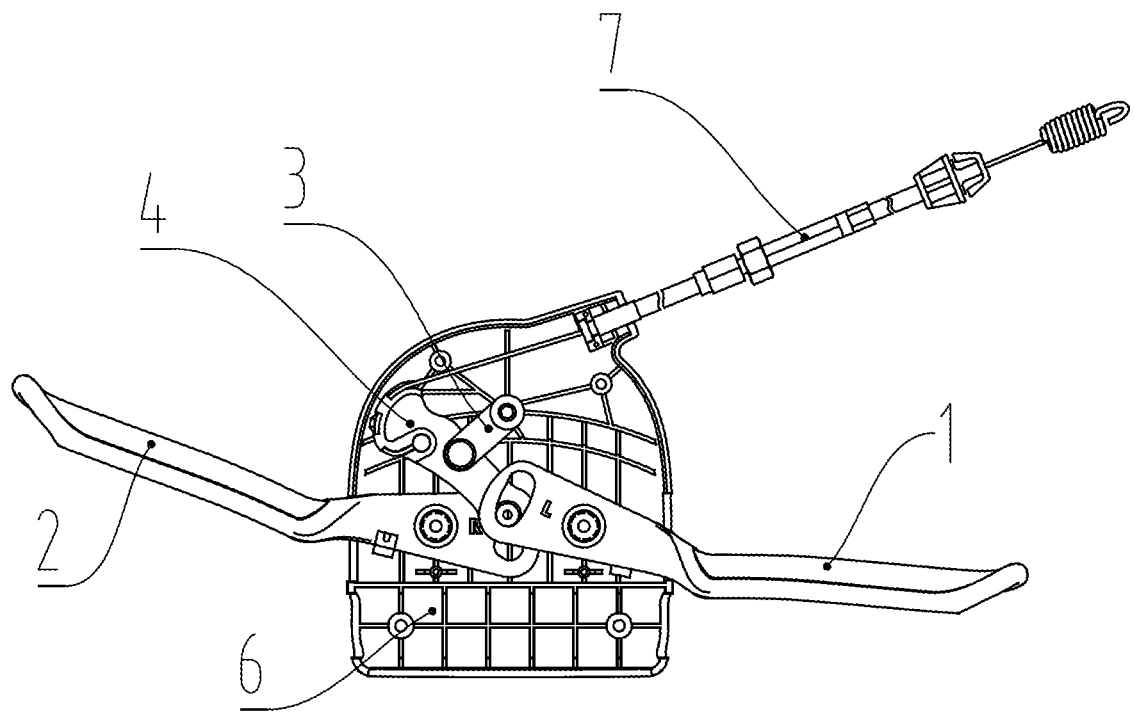
FIG. 10 is a third working state diagram of the dual handle speed adjustment device of the present invention (the left handle is pinched, and the right handle is loosened).
Figure 11:
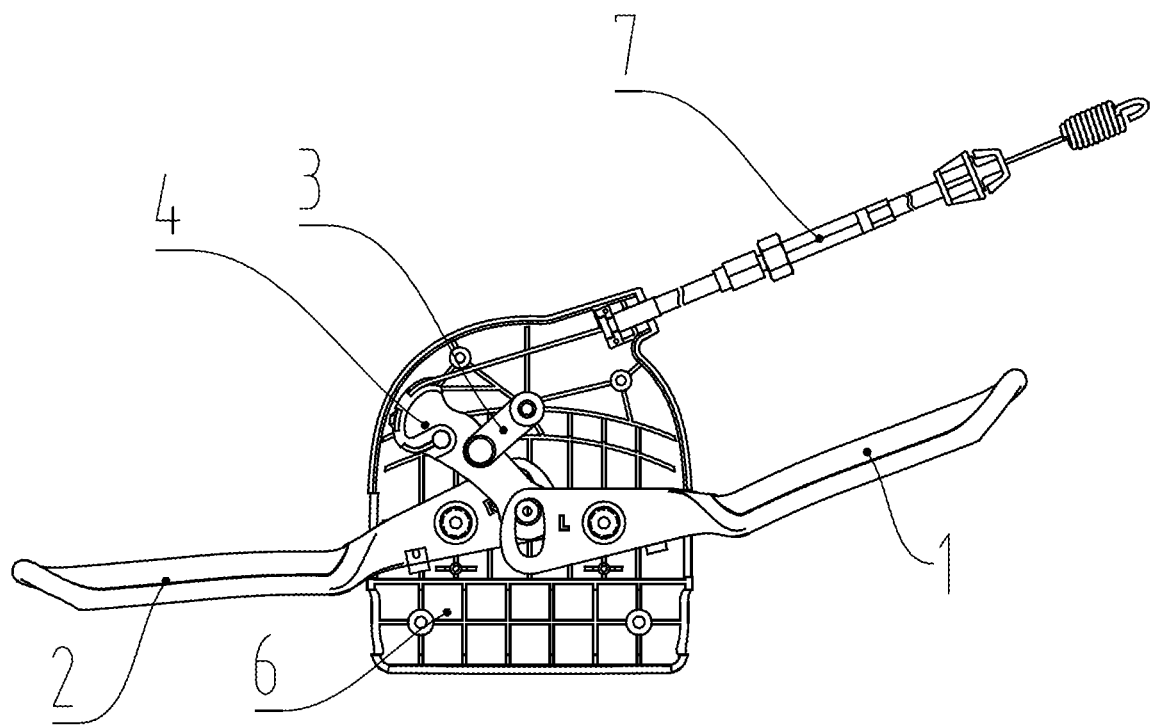
FIG. 11 is a fourth working state diagram of the dual handle speed adjustment device of the present invention (the left handle is loosened, and the right handle is pinched).

As shown in FIG. 10 and FIG. 11, when only one of the left and right handles is operated, since the left handle 1 and the right handle 2 of this embodiment are connected to the slider pin 41 through a respective oblong hole, the operated handle drives the slider 4 through the associating oblong hole to pull the pull wire 7. Since the other non-operated handle is also connected to the slider 4 through an oblong hole, there is an idle stroke when the slider pin 41 of the slider 4 is moved in the oblong hole. The idle stroke enables slider 4 to complete the speed adjustment process without triggering the swing of the unoperated handle, which can avoid driving the unoperated handle. During the tensioning or slackening of the pull wire 7 by the slider 4, the link 3 acts as a pivotable pivot.

The invention can avoid mutual interference between the left handle 1 and the right handle 2 during the speed adjustment process. At the same time, the left handle 1 and the right handle 2 share the link 3, the slider 4 and the pull wire 7, and the complexity of the device is minimized.

Figure 12:
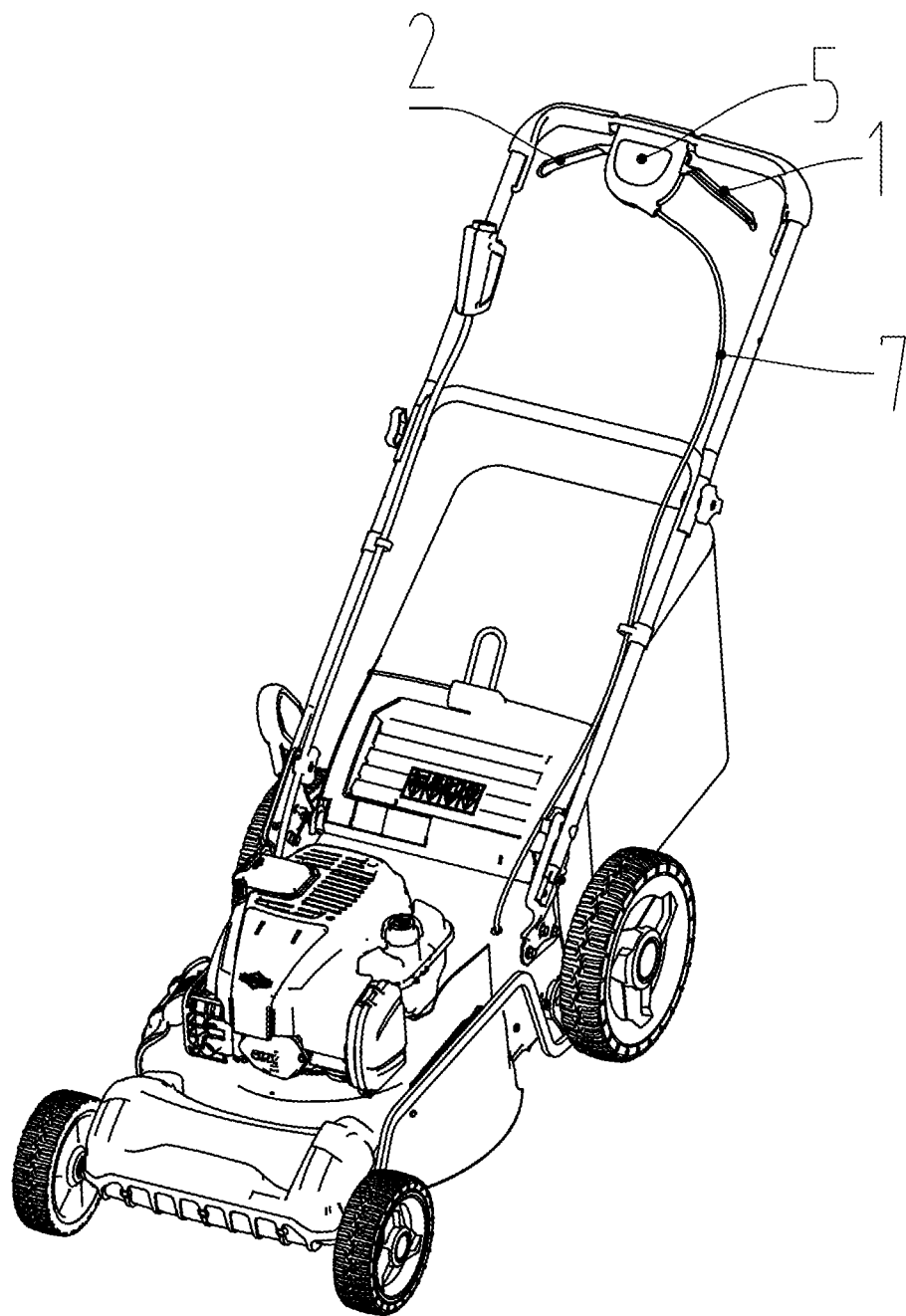
FIG. 12 is a structural diagram of a lawn mower in accordance with the present invention.

As shown in FIG. 12, the invention also discloses a lawn mower that uses the dual handle speed adjustment device of the present invention. Specifically, the lawn mower also comprises a handlebar (usually a metal rod) connected to the cutting head. The dual handle speed adjustment device is connected to the handlebar of the lawn mower. The slider 4 is connected to the speed control device of the cutting head through the pull wire 7.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A dual handle speed adjustment device, comprising a left handle (1), a right handle (2), a link (3) and a slider (4), said left handle (1) and said right handle (2) being each provided with an actuating end, an operating end and a handle hinge (11, 21) as a pivot axis, said slider (4) comprising a first connection end and a second connection end, said first connection end of said slider (4) being connected to the actuating end of said left handle (1) and the actuating end of said right handle (2), said left handle (1) and said right handle (2) independently acting on said slider when they are turned, said second connection end of said slider (4) being connected to a speed control device, a part of said slider (4) between said first connection end and said second connection end being hinged to one end of said link (3), said link (3) having an opposite end thereof provided with a link rotation axis.

2. The dual handle speed adjustment device as claimed in claim 1, wherein said left handle (1) and said right handle (2) are each provided with an elastic device for driving the reset of said left handle (1) and said right handle (2).

3. The dual handle speed adjustment device as claimed in claim 2, wherein said elastic device is a torsion spring sleeved on said handle hinge (11, 21) with one end thereof connected to said left handle (1) and said right handle (2).

4. The dual handle speed adjustment device as claimed in claim 1, wherein said handle hinge (11, 21) of each of said left handle (1) and said right handle (2) is a through hole connected to a handle pin, said through hole of said handle hinge (11, 21) being provided with a through-hole extension portion (111, 211), the through-hole extension portions (111, 211) of said left handle (1) and said right handle (2) being disposed opposite to each other; said slider (4) is set between said left handle (1) and said right handle (2).

5. The dual handle speed adjustment device as claimed in claim 1, wherein said link (3) is connected to said slider (4) through a second link pin (32); said link rotation axis is a first link pin (31).

6. The dual handle speed adjustment device as claimed in claim 1, wherein the actuating ends of said left handle (1) and said right handle (2) are respectively provided with a slider connection hole (13), said slider connection hole (13) being connected to said first connection end of said slider (4) through a slider pin (41).

7. The dual handle speed adjustment device as claimed in claim 6, wherein said slider connection hole (13) is an oblong hole.

8. The dual handle speed adjustment device as claimed in claim 1, wherein said slider (4) is connected to said speed control device through a pull wire (7), said slider (4) having a pull wire connection end provided with a pull wire connection hole (42) for connecting said pull wire (7), said pull wire connection end of said slider (4) being an arc-shaped end (43), said arc-shaped end (43) having an arc shape surface provided with a plurality of stopper blocks (44), said pull wire (7) being connected between said stopper blocks (44).

9. The dual handle speed adjustment device as claimed in claim 1, wherein said link (3) further comprises a connection slot (33) connected to said slider (4).

10. The dual handle speed adjustment device as claimed in claim 1, further comprising a housing, said housing comprising a lower shell (5) and an upper shell (6) connected to each other, said lower shell (5) being provided with a lower shell outlet end (51), said upper shell (6) being provided with an upper shell outlet end (61), wherein said link (3) is connected to said lower shell (5) and said upper shell (6) through a first link pin (31); said handle hinges (11, 21) of said left handle (1) and said right handle (2) are connected to said lower shell (5) and said upper shell (6) through a handle pin.

* * * * *